US010713183B2

(12) United States Patent
Frenkel et al.

(10) Patent No.: US 10,713,183 B2

(45) Date of Patent: Jul. 14, 2020

(54) VIRTUAL MACHINE BACKUP USING SNAPSHOTS AND CURRENT CONFIGURATION

(71) Applicant: Red Hat Israel, Ltd., Raanana (IL)

(72) Inventors: Omer Frenkel, Tel Aviv (IL); Mike Kolesnik, Ramat-Gan (IL)

(73) Assignee: Red Hat Israel, Ltd., Raanana (IL)

( * ) Notice: Subject to any disclaimer, the term of this patent is extended or adjusted under 35 U.S.C. 154(b) by 196 days.

(21) Appl. No.: 13/687,486

(22) Filed: Nov. 28, 2012

(65) Prior Publication Data

US 2014/0149696 A1 May 29, 2014

(51) Int. Cl.

*G06F 12/16* (2006.01)
*G06F 11/14* (2006.01)
*G06F 9/455* (2018.01)

(52) U.S. Cl.

CPC .......... *G06F 12/16* (2013.01); *G06F 9/45558* (2013.01); *G06F 11/1451* (2013.01); *G06F 11/1469* (2013.01); *G06F 2009/45562* (2013.01); *G06F 2201/815* (2013.01)

(58) Field of Classification Search

CPC .. G06F 12/16; G06F 9/45558; G06F 11/1451; G06F 11/1469; G06F 11/1448; G06F 2201/84; G06F 17/30088; G06F 17/30233; G06F 2009/45562; G06F 2009/45575; G06F 2201/815; G06F 11/1446; G06F 11/1458; G06F 17/30312; G06F 9/45533

See application file for complete search history.

(56) References Cited

U.S. PATENT DOCUMENTS 7,574,461 B1 * 8/2009 Armorer ............. G06F 11/1458
7,693,889 B1 * 4/2010 Armorer ............. G06F 11/1466 707/653
8,364,639 B1 1/2013 Koryakina et al.
8,463,825 B1 * 6/2013 Harty et al. .................. 707/813
8,621,274 B1 12/2013 Forgette et al.
8,683,495 B1 * 3/2014 Moore .................... G06F 9/485 718/1
8,813,072 B1 * 8/2014 Signaoff ............. G06F 9/45541 718/1
9,223,659 B1 * 12/2015 Natanzon ............ G06F 11/1456
9,612,853 B2 * 4/2017 Agrawal ............. G06F 11/3495
2004/0024961 A1 * 2/2004 Cochran ............... G06F 3/0617 711/112
2004/0078533 A1 * 4/2004 Lee ..................... G06F 11/1456 711/162
2005/0114614 A1 * 5/2005 Anderson et al. ............ 711/162
2005/0240828 A1 * 10/2005 Rothman ............ G06F 11/3485 714/43
2006/0075294 A1 * 4/2006 Ma ...................... G06F 11/1451 714/13

(Continued)

*Primary Examiner* — Prasith Thammavong
*Assistant Examiner* — Alex G Olson
(74) *Attorney, Agent, or Firm* — Lowenstein Sandler LLP

(57) ABSTRACT

A computer system generates snapshot backups of a virtual machine by creating a metadata snapshot and a backup snapshot. The computer system identifies a backup request for a virtual machine operating on a host computing system, initiates a backup snapshot of storage devices in use by the virtual machine, generates a metadata snapshot of a configuration of the virtual machine, and maintains the metadata snapshot in a data store.

20 Claims, 4 Drawing Sheets

300

START
Restore manager identifies a restore request 302
Restore manager retrieves virtual machine configuration and corresponding virtual storage devices 304
Integrity of virtual storage devices verified? 306
Yes
No
Present preview of virtual machine based on virtual storage devices and virtual machine configuration 310
Present virtual machine configuration with any intact virtual storage device 308
Commit preview of virtual machine? 312
No
END
Yes
Restore virtual machine 314

(56) References Cited

U.S. PATENT DOCUMENTS

2006/0085784 A1 4/2006 Traut et al.
2007/0055833 A1* 3/2007 Vu .................... G06F 11/1469 711/162
2007/0130229 A1* 6/2007 Anglin .............. G06F 17/30017
2007/0185934 A1* 8/2007 Cannon ............... G06F 11/1469
2009/0113423 A1* 4/2009 Hiltgen ............... G06F 9/45558 718/1
2009/0222632 A1* 9/2009 Sasage et al. ................ 711/162
2009/0271581 A1* 10/2009 Hinrichs, Jr. ....... G06F 11/1441 711/162
2009/0282203 A1* 11/2009 Haustein ............. G06F 11/1461 711/162
2009/0313447 A1* 12/2009 Nguyen .............. G06F 11/1451 711/162
2010/0049754 A1* 2/2010 Takaoka .............. G06F 11/1435 707/E17.01
2010/0122248 A1* 5/2010 Robinson ................ G06F 9/485 718/1
2010/0333123 A1* 12/2010 Mehta .................... H04H 60/37 725/13
2011/0271067 A1* 11/2011 Chou .................. G06F 11/1448 711/162
2012/0060006 A1* 3/2012 Paterson-Jones et al. .... 711/162
2012/0144391 A1 6/2012 Ueda
2012/0173824 A1* 7/2012 Iyigun et al. ................. 711/144
2012/0233608 A1* 9/2012 Toeroe ................ G06F 9/45558 718/1
2012/0303902 A1* 11/2012 Butterworth et al. ........ 711/133
2012/0323853 A1* 12/2012 Fries ..................... G06F 11/301 707/649
2013/0046948 A1* 2/2013 Vaghani et al. .............. 711/162
2013/0054533 A1* 2/2013 Hao et al. ..................... 707/649
2013/0055249 A1* 2/2013 Vaghani et al. .................. 718/1
2013/0166511 A1* 6/2013 Ghatty ................ G06F 11/1469 707/649
2013/0262800 A1* 10/2013 Goodman ............ G06F 3/0647 711/162
2014/0095817 A1* 4/2014 Hsu et al. ..................... 711/162

* cited by examiner

200

VIRTUAL MACHINE BACKUP USING SNAPSHOTS AND CURRENT CONFIGURATION

TECHNICAL FIELD

The embodiments of the disclosure relate generally to virtual machines and, more specifically, relate to a mechanism for generating a metadata snapshot and a storage device snapshot.

BACKGROUND

Distributed computing is the use of computing resources (hardware and software) that are delivered as a service over a network (typically the Internet), often referred to as "cloud computing." In a distributed computing environment, a customer pays a "cloud provider" to execute a program on computer hardware owned and/or controlled by the cloud provider. It is common for cloud providers to make virtual machines hosted on its computer hardware available to customers for this purpose. Virtual machines are software implementations of a physical device than can execute programs in a manner equivalent to the physical device.

The cloud provider typically provides an interface that a customer can use to manage virtual machines and associated resources such as processors, storage, and network services, etc. The interface also allows the customer to install and execute programs, and to request backups and restorations of virtual machines. It may be desirable to backup the data and state of the virtual machine; however, such backups can be time consuming. Additionally, restoring such a state backup can require the complete provisioning of the virtual machine state.

BRIEF DESCRIPTION OF THE DRAWINGS

Embodiments of the disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide a mechanism for restoring an image of a virtual machine by utilizing a snapshot manager to create a metadata snapshot of virtual machine configuration information, or metadata, in a data store separately from storage snapshots of virtual machine storage devices. In embodiments of the disclosure, a computer system generates images of a virtual machine by creating a metadata snapshot and a storage snapshot. The computer system identifies a restore request for a virtual machine operating on a host computing system, initiates a storage snapshot of storage devices in use by the virtual machine, generates a metadata snapshot of a configuration of the virtual machine, and maintains the metadata snapshot in a data store separately from the storage snapshot. The computer system also creates a link between the metadata snapshot and the storage snapshot. The link, in one example, is a unique identifier assigned to both the metadata snapshot and the storage snapshot. The metadata snapshot and the storage snapshot may be associated with an identifier such as a timestamp The computer system also provides a mechanism for restoring a virtual machine based on the metadata snapshot and the storage snapshot. The computer system identifies a restore request to restore the virtual machine, retrieves the metadata snapshot, verifies the integrity of the storage snapshot of the storage devices, provides a preview of the virtual machine based on the metadata snapshot and the storage snapshot, and provisions the virtual machine based on the metadata snapshot and the storage snapshot. One advantage of using such a system is the ability to preview multiple different versions of backups of a virtual machine before committing, or provisioning, a specific snapshot of the virtual machine. Also, maintaining the metadata snapshot separately from the storage snapshot reduces memory usage for virtual machine snapshots, as typically metadata is not changed as frequently as storage content. Additionally, if the storage device snapshot is corrupted, the metadata snapshot provides insight into the configuration of the virtual machine at a particular point in time.

Figure 1:
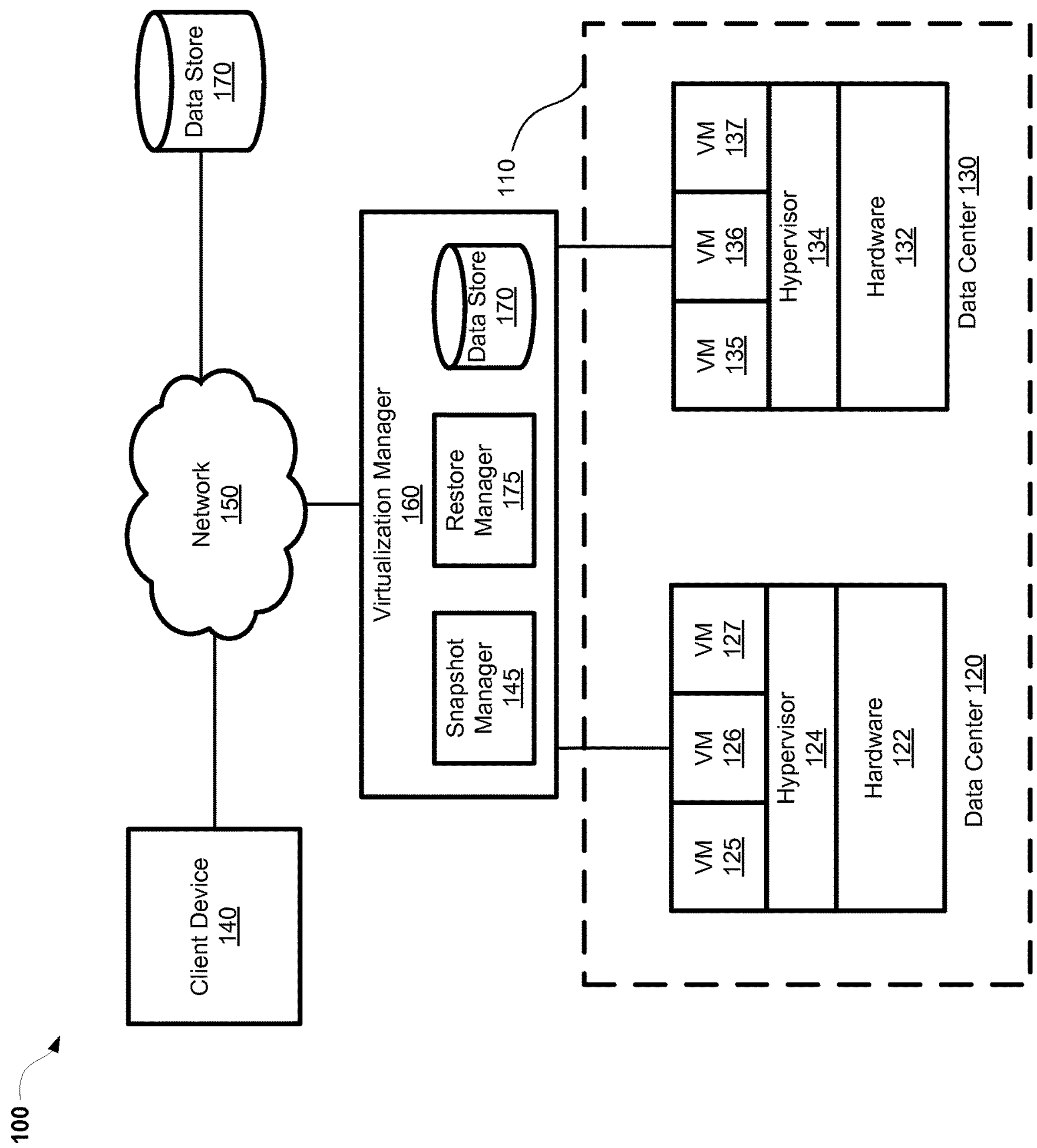
FIG. 1 is a block diagram of a network environment for implementing a virtualization manager according to one embodiment of the present disclosure.

FIG. 1 is a block diagram of a network architecture 100, in which embodiments of the disclosure may operate. The network architecture 100 includes a virtualization infrastructure 110 of an organization that spans multiple data centers. For simplicity, only two data centers are shown. Data center 120 may be located in one geographic area (for example Europe) and data center 130 may be located in another geographic area (for example East Coast USA).

Data center 120 includes various hardware resources 122, such as physical servers and various processing and communications resources. The virtualization infrastructure 110 can include various servers and controllers not shown for simplicity (such as a distributed resource (e.g., cloud) controller, a provisioning server, etc) that enable the virtualization infrastructure 110 to deploy a hypervisor 124 on one or more of the hardware resources 122 and to deploy virtual machines 125-127 using the hypervisor 124 (also known as a virtual machine monitor (VMM)).

In one embodiment, hypervisor 124 is a component of a host operating system (OS). Alternatively, the hypervisor 124 may run on top of a host OS, or may run directly on host hardware without the use of a host OS. The hypervisor 124, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The hypervisor 124 presents to other software (i.e., "guest" software) the abstraction of one or more virtual machines (VMs).

Data center 130 can be implemented in a manner similar to data center 120. For example, data center 130 may include one or more hypervisors 134 running on hardware resources 132. Such hardware resources 132 may represent hardware resources of multiple host machines arranged in a cluster. Each hypervisor may manage one or more virtual machines. For example, hypervisor 134 may deploy and manage virtual machines 135, 136, 137.

The virtualization infrastructure 110 can be used to provide various composite services (also known as composite applications). A composite application is an application that is installed on multiple machines (e.g., on multiple virtual machines). In the case of virtual machines, the virtual machines may all run on the same data center 120, 130, or may run on different data centers at different geographic locations. Each component of the application may be installed on a virtual machine optimized for the component.

In one embodiment, a single component of the composite application is part of a virtual appliance. A virtual appliance may be a virtual machine image file that includes a preconfigured operating system environment and a single application (e.g., a component of the composite application). The virtual appliance may simplify the delivery, setup and operation of that single application. The virtual appliance may be a subset of a virtual machine. Virtual appliances may be used for deploying network applications, such as firewalls, virtual private networks, wide area network (WAN) optimizers, web servers, application servers, database management systems, and so forth.

The composite application and its components may be made up of several software "applications," so the composite application will sometimes be referred to as a composite service. For example, a composite application or service can be a Web application, such as a news site, a social networking site, or a blog site. Such a composite application can have various components. For example, a 3-tier application will have an interface tier (Web server), a business logic tier (application server) and a data tier (database management system). Various other tiers are possible, including an orchestration tier to distribute and manage jobs between multiple servers.

For example, a composite service may consist of a database server hosted—in data center 120—on virtual machine 125, an application server hosted on virtual machine 126, and a web server hosted on virtual machine 127. In data center 130, another application server for the composite service can be hosted on virtual machine 135 and another web server for the composite service can be hosted on virtual machine 136. In another example, data center 120 may host a virtual appliance associated with a composite application (e.g., an application server of the composite application), and data center 130 may host a second virtual appliance associated with the composite application (e.g., a web server of the composite application).

In one embodiment, a client 140 is connected to the virtualization infrastructure—and ultimately to the virtual machines—via a network 150, which may be a private network (e.g., a local area network (LAN), a wide area network (WAN), intranet, or other similar private networks) or a public network (e.g., the Internet). The client 140 may be a mobile device, a PDA, a laptop, a desktop computer, or any other computing device.

In one embodiment, the virtualization infrastructure 110 also includes, or in the alternative, communicates with a virtualization manager 160. The virtualization manager 160 monitors operating parameters of the data centers 120, 130, including performance metrics of each individual virtual machine host executing as part of the data center 120. Examples of operating parameters for the data center can include, but are not limited to, number of host machines, total number of processing cores, network bandwidth capability, power usage, reliability (e.g., uptime), storage capacity, etc. As part of maintaining the operating parameters of the data centers, the virtualization manager 160 is also configured to maintain the performance metrics of each host, which may include, but is not limited to, number of physical processors, RAM capacity, physical storage capacity, number of virtual processors, virtual RAM capacity, virtual storage capacity, quantity and type of physical and virtual network interfaces, number of virtual machines currently executing on the host, and processor and memory usage by the virtual machines.

The virtualization manager 160, in one embodiment, maintains information on characteristics of all virtual environments and underlying hardware and software in those virtual environments that it interacts with. This may include information on underlying hardware (e.g., processor resources, memory resources, etc.), information on a host operating system, information on a hypervisor, information on virtual machines, and so forth. Each virtual machine or component of a composite application (e.g., each virtual appliance) may specify configuration parameters, such as minimum resources, a type of hypervisor that it will function on, and so forth.

As discussed above, virtualization manager 160 may interact with a virtual environment that spans multiple different data centers 120, 130, and may additionally interact with multiple different virtualization environments. For example, the virtualization manager 160 may interact with a first virtualization environment that uses an underlying hypervisor provided by VMWare®, and with a second virtualization environment that uses an underlying hypervisor provided by Red Hat®. The virtualization manager 160 maintains information on the underlying software and hardware in each such virtualization environment.

The virtualization manager 160, in one embodiment, includes a snapshot manager 145 and a data store 170. The data store 170 may be integrated with the virtualization manager 160, or alternatively, accessible over the network 150. The snapshot manager 145 is configured to initiate metadata snapshots and storage snapshots of any virtual machine hosted in the virtualization infrastructure 110. A metadata snapshot refers to saving the state (e.g., active, hibernated, paused, etc.) of the virtual machine together with the resource usage of the host (e.g., hardware 122) utilized by the virtual machine (e.g., VM 125). The storage snapshot of the virtual machine, in one embodiment, may include copies of data in all virtual storage devices (e.g., virtual hard disk, virtual RAM, virtual removable storage, etc. Examples of metadata include, but are not limited to, processor or other hardware logs, processor state, hardware state, memory state, physical storage usage, devices (physical or virtual) in use by the virtual machine, current configuration information (e.g., data, scripts, instructions, or other information used by a hardware device or hypervisor 124 to implement the virtual machine) of the virtual machine, virtual machine devices (such as virtual network cards, display adapters, usb, pci addresses), virtual machine name, virtual machine type (server/desktop), timezone, permissions, cpu and memory configurations, etc, etc.

The snapshot manager 145 is configured to instruct the hypervisor 124 to create and maintain copies of the virtual storage devices. The snapshot manager 145, in one embodiment, is also configured to obtain the metadata associated with the virtual machine. In one example, the snapshot manager 145 monitors the host device (e.g., hardware 122) to capture the metadata of the virtual machine. In another embodiment, the snapshot manager 145 requests that the hypervisor 124 collect the metadata and communicate the metadata with the snapshot manager 145. The snapshot manager 145 maintains the metadata snapshot separately from the backup of the virtual storage devices in the data store 170. In one embodiment, the data store 170 is a relational database where every metadata snapshot taken of a virtual machine is maintained as a record in the database. The metadata snapshot may be stored in the data store 170 with an identifier that distinguishes one metadata snapshot from another and associates the metadata snapshot with a corresponding storage snapshot. In other words, the identifier creates a link between the metadata snapshot and the storage snapshot. In one example, the identifier is a time stamp indicative of the date and time when the snapshot was created by the snapshot manager 145. Another example of an identifier may include an identifier that indicates a type of maintenance performed to the virtual machine. For example, a snapshot that is created when a software update is applied may have an identifier that is indicative of the software update. In another embodiment, the identifier may be a virtual machine identifier, or an arbitrary generated number.

The snapshot manager 145 is also configured for managing the snapshot schedule of the virtual machines (e.g., VM 125, 126, 127). The snapshot manager 145 may initiate snapshots based on a schedule that indicates times, such as particular weeks, days, hours, or a schedule that is based on the passage of time (e.g., schedule a backup every hour). The schedule may be determined by a user, or alternatively, predefined in the snapshot manager 145. In another embodiment, the snapshot manager 145 may be configured to receive a request, via the network 150, from the client device 140.

The virtualization manager 160 also includes a restore manager 175. The restore manager is configured to restore a metadata snapshot and storage snapshot created by the snapshot manager 145 to one of the host devices. In one embodiment, the restore manager 175 is configured to provide a user interface to the client device 140 so that a user may interact with the restore manager 175. The user interface may be a command-line interface or a graphical user interface. The restore manager 175 is configured, in one example, to provide a "preview" of the snapshot to the user before actually provisioning the snapshot as a virtual machine on a host device. A preview, in one embodiment is a working copy of the virtual machine at the time of the snapshot.

The restore manager 175 is configured to retrieve metadata from the data store 170 that corresponds to the virtual machine that the user desires to restore. In one example, the restore manager 175 retrieves a specific metadata snapshot in response to a request from the user. In another embodiment, the restore manager 175 may be configured to automatically retrieve a metadata snapshot for restoration. For instance, the virtualization manager 160 may be configured to detect when a virtual machine becomes inoperable. In this situation, the restore manager 175 may be configured to automatically retrieve a most recent metadata snapshot. The restore manager 175 communicates the metadata snapshot with a hypervisor 124 that provisions a restored version of the virtual machine using the metadata snapshot and the storage snapshot. In another embodiment, the restore manager 175 may be configured to identify a "last known good metadata snapshot and storage snapshot," (i.e., a most recent version of the virtual machine that is known to function properly) and communicate this version with the hypervisor 124 (or other agent configured to restore and/or provision a virtual machine).

While various embodiments are described in terms of the environment described above, the facilities and systems may be implemented in a variety of other environments and combinations. For example, the snapshot manager 145 may be hosted by a virtual machine of the virtualization infrastructure 110.

Figure 2:
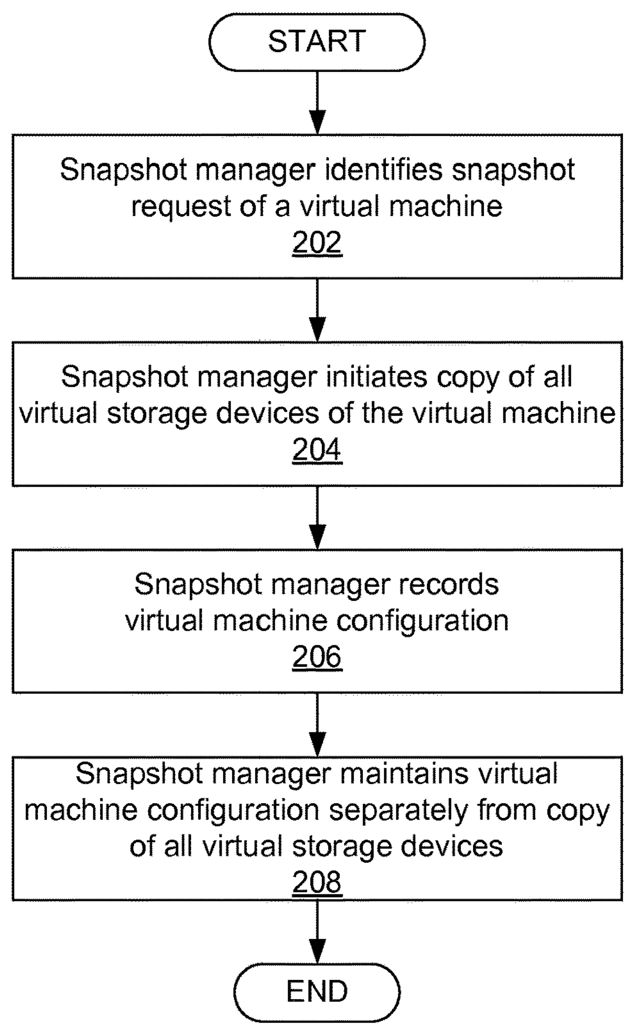
FIG. 2 is a flow diagram illustrating a method for initiating a backup of a virtual machine according to an embodiment of the disclosure

FIG. 2 is a flow diagram illustrating a method 200 for initiating a snapshot of a virtual machine. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the snapshot manager 145 of FIG. 1.

The method 200 starts and the processing logic, at block 202, identifies a snapshot request of a virtual machine. In one embodiment, the processing logic identifies a backup request by receiving a snapshot request from a user via a user interface. The user interface may be a graphical user interface (e.g., a website having virtual machine configuration information), or alternatively, a command line interface that allows the user to communicate with the virtual machine. In another embodiment, the processing logic identifies a snapshot request by interpreting a backup schedule. In other words, the processing logic may identify a snapshot request by identifying a snapshot schedule and initiating a snapshot according to the snapshot schedule. The snapshot schedule may request an hourly snapshot, or alternatively, the snapshot schedule may request a snapshot each time any software is modified in the virtual machine.

At block 204, the processing logic initiates a copy of all virtual storage devices of the virtual machine. For example, the processing logic may be configured to instruct the hypervisor 124 to create a copy of each storage device in use by the virtual machine. In an alternative embodiment, the processing logic may perform the snapshot. The storage devices in use by the virtual machine may include, but are not limited to, virtual storage drives, virtual RAM, etc.

At block 206, the processing logic generates a metadata snapshot of the virtual machine. The processing logic may generate a metadata snapshot and insert, at block 208, the snapshot into the data store 170 separately from the storage snapshot of the storage devices as described above. The processing logic may attach an identifier to the metadata snapshot and the storage snapshot, such as a time stamp. Groups of metadata snapshots that correspond to a virtual machine may be "chained" to one another. Similarly, groups of storage snapshots may also be chained together. As will be discussed below with reference to FIG. 3, each metadata or storage snapshot may be "chained' or linked to previous respective metadata or storage snapshot. As such, a user may travel backward from the most recent metadata and storage snapshot to preview previous versions of the metadata and storage snapshots.

Figure 3:
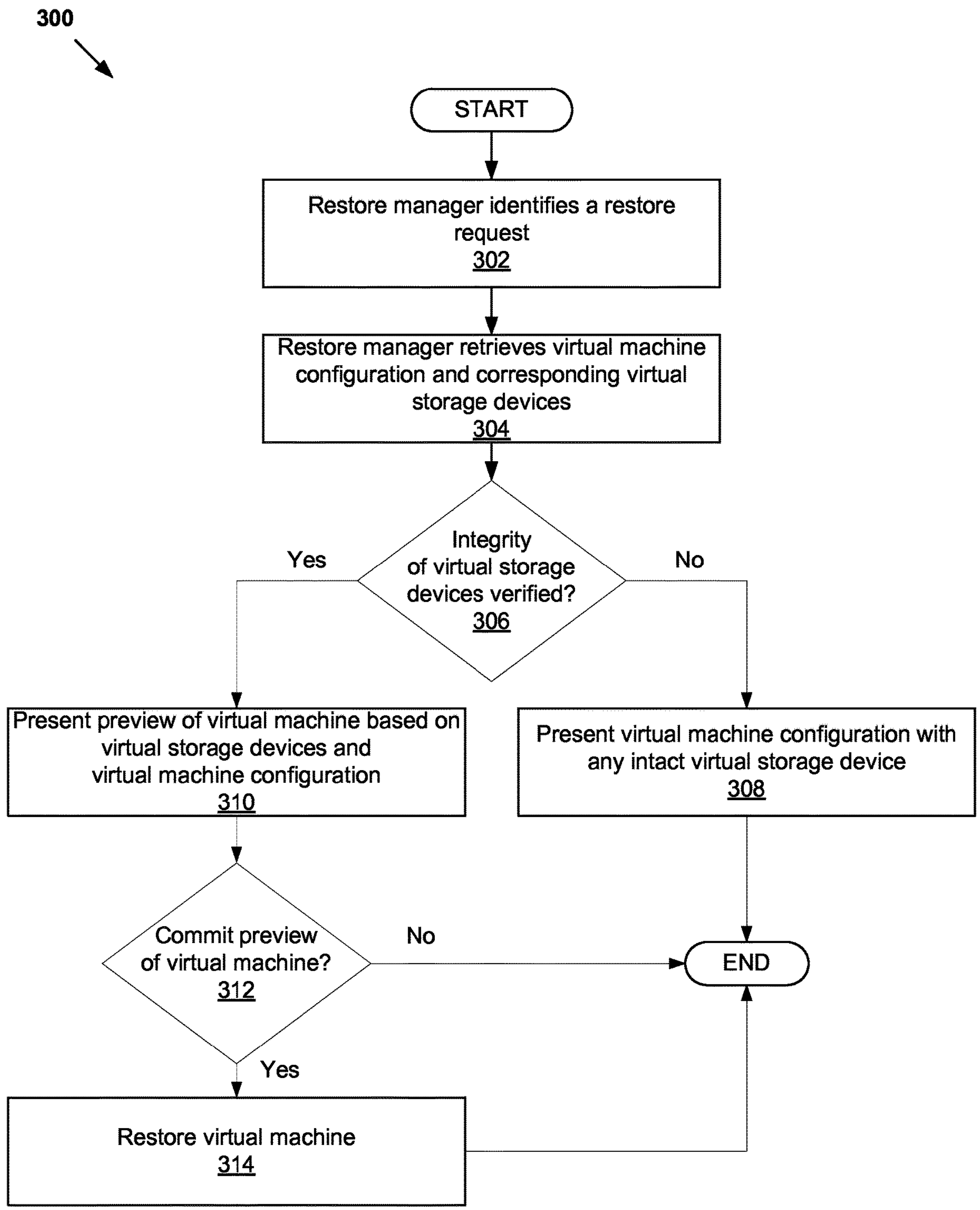
FIG. 3 is a flow diagram illustrating a method for restoring a backup of a virtual machine.

FIG. 3 is a flow diagram illustrating a method 300 for restoring a snapshot of a virtual machine. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the restore manager 175 of FIG. 1.

The method 300 starts, and the processing logic, at block 302, identifies a restore request. The processing logic, in one embodiment, identifies a restore request by receiving, via a user interface, a request from a user or client device to restore a virtual machine. In another embodiment the processing logic receives a restore request from the virtualization manager which may be configured to identify when a virtual machine has become unresponsive, for example.

At block 304, the processing logic retrieves the virtual machine configuration data (e.g., metadata) from the data store. The processing logic, in one embodiment, is configured to retrieve a specific metadata and separate storage snapshot from the data store based upon the restore request. The restore request may include a snapshot identifier, such as a time stamp received from a user. In another embodiment, the processing logic retrieves a most recent snapshot, or alternatively, a snapshot of a last known functioning configuration. In one embodiment, the virtualization manager 160, which monitors the health of the virtual machines, may maintain a list of known functioning virtual machines, and therefore provide the processing logic with a timestamp, for example, that is indicative of a known functioning version of the virtual machine. The processing logic also retrieves a storage snapshot of the storage devices that corresponds to the retrieved metadata snapshot. In one example, the storage snapshot of the storage devices is maintained by a host device (e.g., hardware 124 of FIG. 1), and the host device prepares the storage snapshot of the storage device for provisioning by, for example, mounting the storage snapshot.

At decision block 306, the processing logic determines if the integrity of the virtual storage device snapshot is valid. In one embodiment, the processing logic determines if the integrity of the virtual storage device snapshot is valid by performing a cyclic redundancy check, or by comparing hash values. The processing logic, in one example, is also configured to determine if the desired storage snapshot of the storage devices no longer exists. Stated differently, over time, storage requirements may dictate that old storage snapshots of the storage devices be deleted. The processing logic determines if the storage snapshot corresponding to the retrieved metadata snapshot exists, and if the storage snapshot is valid. If not, the processing logic presents only the virtual machine metadata at block 308. In a further embodiment, the processing logic may determine that while some virtual storage devices are corrupt, at least one virtual storage device is intact (i.e., integrity is verified). In this example, the processing logic presents the virtual machine configuration with the intact virtual storage device.

If the processing logic determines that the storage snapshot is valid, the processing logic, at block 310, presents a preview of the virtual machine based upon the storage snapshot and the metadata snapshot, as described above with reference to FIG. 1. At decision block 312, the processing logic determines whether to "commit" the virtual machine to a host device. In other words, before provisioning the virtual machine based upon the metadata snapshot and storage snapshot, the processing logic presents the preview to the user and receives instructions from the user of whether to provision the virtual machine, or to preview a different snapshot. If yes, the processing logic, at block 314, restores the virtual machine by provisioning, or instructing a hypervisor to provision a virtual machine based upon the metadata snapshot and the storage snapshot.

Figure 4:
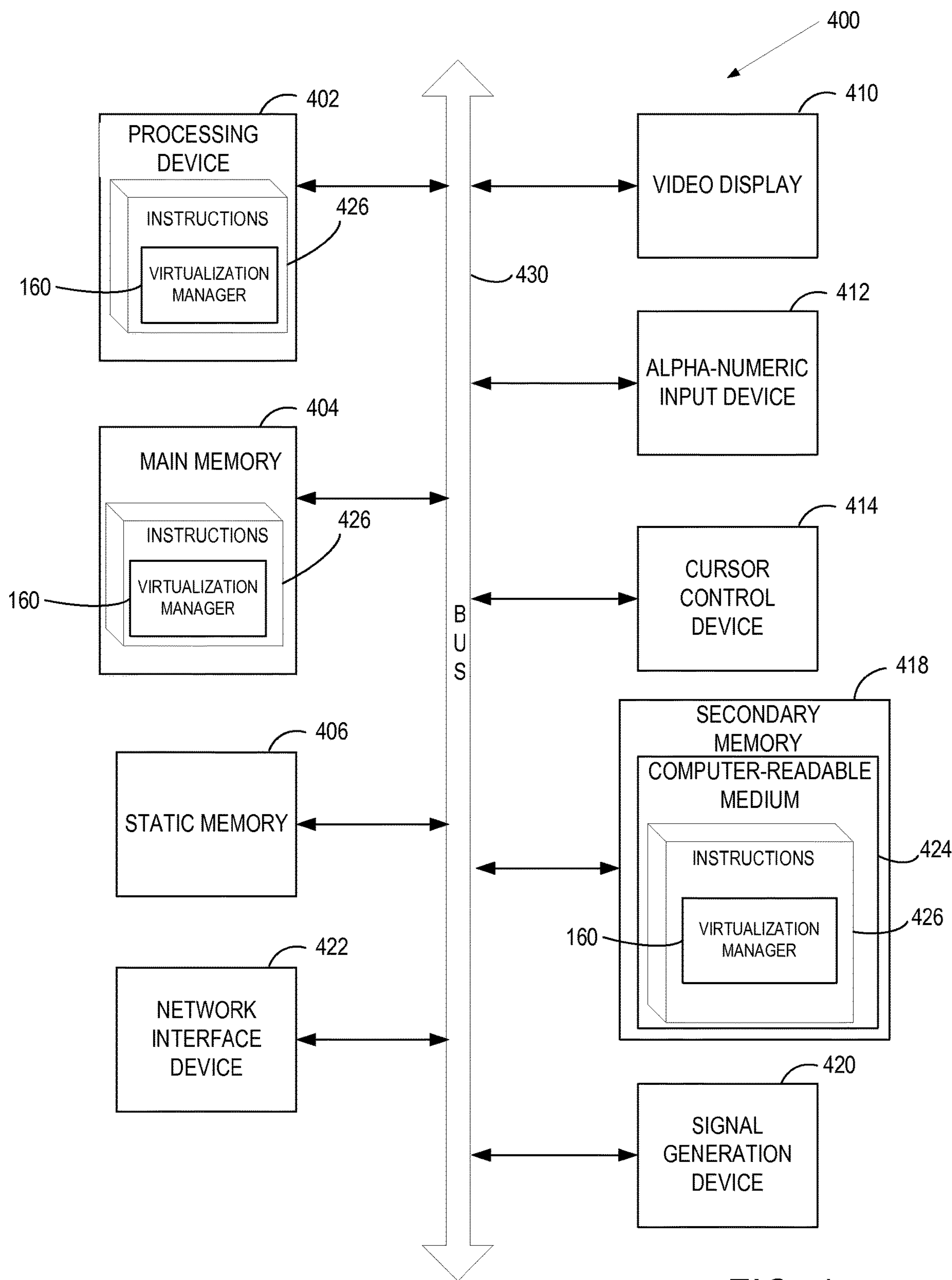
FIG. 4 is a diagram of one embodiment of a computer system for facilitating the provisioning of virtual machines.

FIG. 4 is a diagram of one embodiment of a computer system for facilitating the provisioning of virtual machines. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 418 (e.g., a data storage device in the form of a drive unit, which may include fixed or removable computer-readable storage medium), which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 418 may include a machine-readable storage medium (or more specifically a computer-readable storage medium) 424 on which is stored one or more sets of instructions 426 embodying any one or more of the methodologies or functions described herein. In one embodiment, the instructions 426 include instructions for the virtualization manager 160. The instructions 426 may also reside, completely or at least partially, within the main memory 404 and/or within the processing device 402 during execution thereof by the computer system 400, the main memory 404 and the processing device 402 also constituting machine-readable storage media.

The computer-readable storage medium 424 may also be used to store the instructions 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The instructions 426, components and other features described herein can be implemented as discrete hardware components or integrated in the functionality of hardware components such as ASICS, FPGAs, DSPs or similar devices. In addition, the instructions 426 can be implemented as firmware or functional circuitry within hardware devices. Further, the instructions 426 can be implemented in any combination hardware devices and software components.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "identifying," "receiving," "retrieving," "provisioning," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

In the preceding description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment. Like reference numbers signify like elements throughout the description of the figures.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

identifying, by a processing device, a snapshot request for a virtual machine operating on a host computing system;

initiating, by the processing device, generation of a pair of snapshots responsive to the snapshot request, the pair of snapshots comprising:

a storage snapshot of one or more storage devices in use by the virtual machine, the storage snapshot comprising a copy of data in the one or more storage devices; and a metadata snapshot of a configuration of the virtual machine, the metadata snapshot comprising an execution state of the virtual machine and a resource usage of the host computing system, the resource usage corresponding to the virtual machine;

storing the storage snapshot of the one or more storage devices in use by the virtual machine on a storage device of the host computing system on which the virtual machine is operating;

attaching a first identifier comprising a first timestamp to the storage snapshot of the one or more storage devices in use by the virtual machine;

storing the metadata snapshot of the configuration of the virtual machine in a network attached data store, wherein the network attached data store is separate from the storage device of the host computing system storing the storage snapshot, such that the metadata snapshot is not stored in the same data store as the storage snapshot;

attaching a second identifier comprising a second timestamp to the metadata snapshot of the configuration of the virtual machine, wherein the first timestamp and the second timestamp are the same, and the first identifier and the second identifier create a link between the storage snapshot and the metadata snapshot;

updating the data in the one or more storage devices; and generating an updated storage snapshot to reflect at least one change to the data resulting from updating the data, without changing the configuration of the virtual machine stored in the metadata snapshot.

2. The method of claim 1, further comprising:

identifying a restore request to restore the virtual machine;

retrieving the metadata snapshot;

retrieving the storage snapshot in view of the link between the metadata snapshot and the storage snapshot;

verifying an integrity of the storage snapshot;

providing a preview of the virtual machine in view of the metadata snapshot and the storage snapshot; and provisioning the virtual machine in view of the metadata snapshot and the storage snapshot.

3. The method of claim 2, wherein the restore request further comprises the first identifier indicative of a specific storage snapshot based upon the first timestamp.

4. The method of claim 1, wherein initiating generation of the storage snapshot comprises instructing the host computing system to generate the storage snapshot, and wherein the data store is separate from the backup storage device.

5. The method of claim 1, wherein the metadata snapshot further comprises virtual machine configuration information that comprises at least one of a virtual machine name, a virtual machine type, time zone of the virtual machine, permissions of the virtual machine, processor configuration, or memory configuration.

6. The method of claim 5, further comprising requesting, from one of a virtualization manager or the host computing device, the virtual machine configuration information.

7. The method of claim 2, wherein the restore request further comprises an identifier indicative of one of a virtual machine identifier, or a nondeterministic generated identifier.

8. A non-transitory computer-readable storage medium having instructions that, when executed by a processing device, cause the processing device to:

identify, by the processing device, a snapshot request for a virtual machine operating on a host computing system;

initiate, by the processing device, generation of a pair of snapshots responsive to the snapshot request, the pair of snapshots comprising:

a storage snapshot of one or more storage devices in use by the virtual machine, the storage snapshot comprising a copy of data in the one or more storage devices; and a metadata snapshot of a configuration of the virtual machine, the metadata snapshot comprising an execution state of the virtual machine and a resource usage of the host computing system, the resource usage corresponding to the virtual machine;

store the storage snapshot of the one or more storage devices in use by the virtual machine on a storage device of the host computing system on which the virtual machine is operating;

attach a first identifier comprising a first timestamp to the storage snapshot of the one or more storage devices in use by the virtual machine;

store the metadata snapshot of the configuration of the virtual machine in a network attached data store, wherein the network attached data store is separate from the storage device of the host computing system storing the storage snapshot, such that the metadata snapshot is not stored in the same data store as the storage snapshot;

attach a second identifier comprising a second timestamp to the metadata snapshot of the configuration of the virtual machine, wherein the first timestamp and the second timestamp are the same, and the first identifier and the second identifier create a link between the storage snapshot and the metadata snapshot;

update the data in the one or more storage devices; and generate an updated storage snapshot to reflect at least one change to the data resulting from updating the data, without changing the configuration of the virtual machine stored in the metadata snapshot.

9. The non-transitory computer-readable storage medium of claim 8, wherein the instructions further cause the processing device to:

identify a restore request to restore the virtual machine;

retrieve the metadata snapshot;

retrieve the storage snapshot in view of the link between the metadata snapshot and the storage snapshot;

verify an integrity of the storage snapshot of the storage devices;

provide a preview of the virtual machine in view of the metadata snapshot and the storage snapshot; and provision the virtual machine in view of the metadata snapshot and the storage snapshot.

10. The non-transitory computer-readable storage medium of claim 9, wherein the restore request further comprises the first identifier indicative of a specific storage snapshot based upon the first timestamp.

11. The non-transitory computer-readable storage medium of claim 8, wherein initiating generation of the storage snapshot comprises instructing the host computing system to generate the storage snapshot, and wherein the data store is separate from the backup storage device.

12. The non-transitory computer-readable storage medium of claim 8, wherein the metadata snapshot further comprises virtual machine configuration information that comprises at least one of a virtual machine name, a virtual machine type, time zone of the virtual machine, permissions of the virtual machine, processor configuration, or memory configuration.

13. The non-transitory computer-readable storage medium of claim 12, the instructions further cause the processing device to:

request, from the host computing device, the virtual machine configuration information.

14. The non-transitory computer-readable medium of claim 9, wherein the restore request further comprises an identifier indicative of one of a virtual machine identifier, or a nondeterministic generated identifier.

15. A computing apparatus comprising:

a memory to store a storage snapshot and a metadata snapshot; and a processing device, operatively coupled to the memory, to:

identify a snapshot request for a virtual machine operating on a host computing system;

initiate generation of a pair of snapshots responsive to the snapshot request, the pair of snapshots comprising:

the storage snapshot of one or more storage devices in use by the virtual machine, the storage snapshot comprising a copy of data in the one or more storage devices; and the metadata snapshot of a configuration of the virtual machine, the metadata snapshot comprising an execution state of the virtual machine and a resource usage of the host computing system, the resource usage corresponding to the virtual machine;

store the storage snapshot of the one or more storage devices in use by the virtual machine on a storage device of the host computing system on which the virtual machine is operating;

attach a first identifier comprising a first timestamp to the storage snapshot of the one or more storage devices in use by the virtual machine;

store the metadata snapshot of the configuration of the virtual machine in a network attached data store, wherein the network attached data store is separate from the storage device of the host computing system storing the storage snapshot, such that the metadata snapshot is not stored in the same data store as the storage snapshot;

attach a second identifier comprising a second timestamp to the metadata snapshot of the configuration of the virtual machine, wherein the first timestamp and the second timestamp are the same, and the first identifier and the second identifier create a link between the storage snapshot and the metadata snapshot;

update the data in the one or more storage devices; and generate an updated storage snapshot to reflect at least one change to the data resulting from updating the data, without changing the configuration of the virtual machine stored in the metadata snapshot.

16. The computing apparatus of claim 15, wherein the processing device is further to:

identify a restore request to restore the virtual machine;

retrieve the metadata snapshot;

retrieve the storage snapshot in view of the link between the metadata snapshot and the storage snapshot;

verify an integrity of the storage snapshot;

provide a preview of the virtual machine in view of the metadata snapshot and the storage snapshot; and provision the virtual machine in view of the metadata snapshot and the storage snapshot.

17. The computing apparatus of claim 16, wherein the restore request further comprises the first identifier indicative of a specific storage snapshot based upon the first timestamp.

18. The computing apparatus of claim 15, wherein the processing device is further to instruct the host computing system to generate the storage snapshot, and wherein the data store is separate from the backup storage device.

19. The computing apparatus of claim 15, wherein the metadata snapshot further comprises virtual machine configuration information that comprises at least one of a virtual machine name, a virtual machine type, time zone of the virtual machine, permissions of the virtual machine, processor configuration, or memory configuration.

20. The computing apparatus of claim 16, wherein the restore request further comprises an identifier indicative of one of a virtual machine identifier, or a nondeterministic generated identifier.

* * * * *